(12) United States Patent
Nottbeck et al.

(10) Patent No.: US 12,248,420 B2
(45) Date of Patent: Mar. 11, 2025

(54) COMPUTER SYSTEM FOR CONTROLLING PERIPHERAL DEVICES

(71) Applicant: dSPACE GmbH, Paderborn (DE)

(72) Inventors: Noel Nottbeck, Paderborn (DE); Henry Bathke, Paderborn (DE); Gregor Sievers, Paderborn (DE)

(73) Assignee: dSPACE GMBH, Paderborn (DE)

( * ) Notice: Subject to any disclaimer, the term of this patent is extended or adjusted under 35 U.S.C. 154(b) by 82 days.

(21) Appl. No.: 18/129,438

(22) Filed: Mar. 31, 2023

(65) Prior Publication Data
US 2024/0202155 A1   Jun. 20, 2024

(30) Foreign Application Priority Data

Dec. 20, 2022   (DE) ...................... 10 2022 134 011.2
Jan. 25, 2023   (DE) ...................... 10 2023 101 748.9

(51) Int. Cl.
*G06F 13/40*   (2006.01)
*G06F 9/54*   (2006.01)

(52) U.S. Cl.
CPC .......... *G06F 13/4022* (2013.01); *G06F 9/546* (2013.01)

(58) Field of Classification Search
CPC .................................................. G06F 13/4022
See application file for complete search history.

(56) References Cited

U.S. PATENT DOCUMENTS

2013/0282925 A1* 10/2013 Cawse ................ H04L 12/4625
                                                                710/2
2018/0364039 A1* 12/2018 Hesh ...................... G05B 11/01

FOREIGN PATENT DOCUMENTS

CN           109857685 A      6/2019

OTHER PUBLICATIONS

Lattice Semiconductor:GPIO Expander. Reference Design RD1065; Version 1.3—Apr. 2011; pp. 1-9.
Viego, A. "Remote IO for an FPGA—A Design Project Report" School of Electrical and Computer Engineering of Cornell University, 2021.

* cited by examiner

*Primary Examiner* — David E Martinez
(74) *Attorney, Agent, or Firm* — Muncy, Geissler, Olds & Lowe, P.C.

(57) ABSTRACT

The invention relates to a computer system and method having at least one peripheral device, a control module for controlling the peripheral device, and a connection module, which is connected to the control module via a first data link. The connection module has I/O data ports for exchanging pieces of information with the peripheral device, and the peripheral device is connected to one or multiple of the I/O data ports via a second data link. The number of channels in the first data link is smaller than the number of I/O data ports of the connection module. The control module includes a first gateway, which receives pieces of setpoint state information relating to the I/O data ports of the connection module.

17 Claims, 2 Drawing Sheets

|  | Number of lanes | Function |
|---|---|---|
| Data flow from the control module to the connection module for controlling pins | 1 | Data cycle |
|  | 8 | Bit index for control command (i.e., pin indexes from Figure 3) |
|  | 2 | Driver activation and output state (out enable and out value) |
| Data flow from the connection module to the control module for monitoring pins | 1 | Data cycle |
|  | 8 | Bit index, i.e., pin index |
|  | 1 | Input level ( i.e., actual value of out value) |

Fig. 4

COMPUTER SYSTEM FOR CONTROLLING PERIPHERAL DEVICES

This nonprovisional application claims priority under 35 U.S.C. § 119(a) to German Patent Application No. 10 2022 134 011.2, which was filed in Germany on Dec. 20, 2022, and German Patent Application No. 10 2023 101 748.9 which was filed in Germany on Jan. 25, 2023, and which are both herein incorporated by reference.

BACKGROUND OF THE INVENTION

Field of the Invention

The invention relates to a computer system, including a control module for controlling peripheral devices and a connection module connected therebetween, which has I/O data ports to the peripheral devices, the number of channels in the data link from the control module to the connection module being smaller than the number of I/O data ports of the connection module. The connection module, also referred to as a port expander, permits a higher number of possible connections to peripheral devices than is permitted by the data link from the control module to the connection module. Changes to the peripheral devices require an updating of the configuration of the I/O data ports on the connection module. The control module, the connection module, as well as the peripheral devices communicate with each other for this purpose.

Description of the Background Art

A multiplicity of surroundings sensors (e.g., radar, LIDAR, cameras) are used for logging data in general and, in particular, in sensor and actuator systems in automation as well as in highly automated vehicles and driver assistance systems. A single cable between the sensor (camera, LIDAR head, radar front end) and a control unit (ECU) was originally used to control and/or detect the devices. A network topology is then advantageous, in particular with regard to compactness and flexibility, in which a computer system including a great many peripheral devices has a node with a connection module, which has more I/O data ports than the connecting line from the control module to the connection module. The I/O data ports of the connection module are typically digital in order to control and/or detect a multiplicity of peripheral devices, including their digital I/O pins, for example on serializer and deserializer devices.

In-vehicle data capture systems and prototyping systems are frequently used for data-driven development in the area of highly automated driving and driver assistance, with the aid of which the sensor raw data from, for example, LIDAR, radar, and camera sensors as well as those from automotive buses and networks may be read in, processed, and recorded at a very high bandwidth. In the present case, one also speaks of a logging apparatus for reading in and recording a data stream originating at a sensor and destined for a processing module. The use of such logging apparatuses allows comprehensive data volumes to be recorded during test drives for homologation, data to be played back at a later point in time, or neural networks to be trained. Apparatuses of this type are frequently equipped with powerful hardware accelerators, such as graphics processors (GPUs) or field programmable gate arrays (FPGAs) for the purpose of developing, validating, and optimizing sensor fusion and perception algorithms.

A setpoint state is usually transmitting in the direction of the connection module in each transmission cycle or each period for each I/O data port or I/O pin being used for connecting a peripheral device, regardless of whether a device driver has requested a change of the I/O pin state. The actual state of the I/O pin is also transmitted to the control module in each transmission cycle or each period for each I/O data port or I/O pin, regardless of whether a change has occurred. Since I/O pin changes occur relatively rarely in relation to the transmission cycle, most such transmitted pieces of system information are usually redundant during normal use.

The publication Anthony Viego: Remote IO for an FPGA-A Design Project Report, School of Electrical and Computer Engineering of Cornell University (2021) discloses a hardware architecture, which includes a main device, which controls a multiplicity of peripheral devices on a circuit board, an FPGA, to whose I/O data ports the peripheral devices are connected and which is used as a connection module ("port expander") for connecting the peripheral devices to the main device, and a relatively narrow-band data connection between the main device and the connection module, on which control commands for the peripheral devices or status messages from the peripheral devices are exchanged. The control commands control the configuration of the I/O data ports of the FPGA. The control commands for the I/O data ports are not transmitted periodically but only as needed and thus, in particular, in the case of changes to the configuration of the I/O data ports. The protocol for transmitting the control commands and status data describes, in particular, a device-specific protocol with regard to a particular peripheral device and device-specific device driver, respectively, which has initialized an update. At least one set of control commands for configuring all I/O data ports belonging to a particular peripheral device is thus sent from the main device to the FPGA, and status messages are sent from the peripheral devices.

However, in the case of certain peripheral devices, the configuration of the entire number of device-specific I/O data ports does not always change. As a result, in a device-specific protocol, unnecessary data loads and redundant control commands continue to occur with regard to the configuration of the I/O data ports. The entire set of control commands for each peripheral device has proven to be disadvantageous, in particular in the case of narrow-band transmission lines.

SUMMARY OF THE INVENTION

It is therefore an object of the invention to provide a computer system, with the aid of which these disadvantages are avoided.

According to an exemplary embodiment of the invention, a computer system is provided that includes at least one peripheral device, a control module for controlling the peripheral device, and a connection module, which is connected to the control module via a first data link. The connection module can have I/O data ports for exchanging pieces of information with the peripheral device, and the peripheral device is connected to one or multiple of the I/O data ports via a second data link. The number of channels in the first data link may be smaller than the number of I/O data ports of the connection module, and the control module includes a first gateway, which receives setpoint state information relating to the I/O data ports of the connection module. The first gateway can be configured to send, in response to the receipt of setpoint state information of an I/O data port, a configuration message to the connection module via the first data link, which predefines a setpoint state of the I/O data port at the connection module. The connection module can be configured to receive the configuration message via a second gateway and to set the I/O data ports accordingly.

The computer system can include multiple peripheral devices.

In this way, a computer system is provided, which sends pieces of configuration information, in particular as needed and with regard to each I/O data port. In the case of changes to the configuration of the I/O data ports, no configuration messages thus occur with regard to all I/O data ports or all device-specific I/O data ports, but rather changes to the configuration of the I/O data ports take place on a pin-specific basis and thus more efficiently and in a more demand-controlled manner.

Further advantages of the computer system according to the invention are, for example, improved specifications and performance data with regard to parameters such as latency, jitter, and update rate, which, under specific conditions, make certain applications even possible at all. Particularly in light of advances in developments in a narrow-band control and a large number of peripheral devices, the computer system according to the invention permits a further reduction of the data load in the case of a reconfiguration of I/O data ports and thus an even more efficient protocol for changing I/O data ports on the connection module. The computer system according to the invention is particularly advantageous, in particular, in the case of relatively complex hardware components, each having many I/O data ports, in which the configuration of very few I/O data ports changes depending on the changing operating state of the hardware components.

As mentioned above, a basic aspect of the invention is to transmit control signals for I/O data ports only as needed when a device driver outputs a new setpoint state of an I/O data port and status signals only after a change in a pin state. Only those updates are therefore sent which were expressly requested by a driver of some sort. In particular, the computer system according to the invention leaves open the possibility of checking the driver requests for redundancy and further reducing the number of sent messages in this way. The invention also comprises, in particular, a transmission protocol, which is optimized for controlling a large number of I/O data ports whose status only rarely changes in each case.

The update protocol according to the invention can be pin-specific and thus finely granular. It transmits I/O data port updates individually and without reference to the device or the device driver which requested the updates. The update protocol is thus optimized for a narrow-band control of many I/O data ports, each of which changes its state only relatively rarely in relation to the clock rate of the system.

The term I/O data port can designate an electrical contact, which is used as a connector for an electrically operated device. The electrical contact may be used for transmission, i.e., for sending and/or for receiving data. A further possibility is to use the electrical contact for a power supply. An I/O data port is generally an electrical pin or an I/O pin, which comprises only one single contact. In particular, it may, however, also have more than one electrical contact.

The term channels, in particular also referred to as "lanes," may be designed in relation to the first data link as physical and/or as logical channels in a parallel or a serial connection. In typical applications with many peripheral devices, the first data link represents a bottleneck for communication between the control unit and the peripheral devices, since the control unit frequently permits only a relatively limited number of channels. This then requires a connection module according to the invention, which is also referred to as a port expander.

The computer system can include one or multiple drivers, which are configured to generate at least one setpoint state for the peripheral device and transmit it to the first gateway. An operation-ready state for the peripheral device is typically generated or ensured hereby. The setpoint state generated by the driver is used, in particular, to enable the control unit to configure the connection module via a configuration message in such a way that it has the desired configuration of the I/O data ports for a proper operation of a peripheral device. The properties of the driver may usually be changed later on relatively easily, so that the computer system may be kept up to date.

The configuration message can comprise an I/O data port index and a setpoint state of the indexed I/O data port concerned. This makes it possible for the components of the computer system and, in particular, the connection module, to obtain a direct piece of information relating to the I/O data port to which the requested change to a specific setpoint state applies. The I/O data port index must generally be known to the transmitter module as well as to the receiver module so that the particular I/O data port may be uniquely specified. The advantage of an index is that the relevant I/O data port is named directly, which avoids having to also send a complete vector or a long matrix in each configuration message. Significant data volumes may be reduced hereby, in particular in the case of changes to the configuration which affect only a few I/O data ports.

The configuration message can comprise pieces of information relating to the ability of the I/O data port to be written and read out. An electrical port may be written to, in particular, if pieces of information may be sent thereto and stored or buffered in some form. The term "ability to be read out" refers, in particular, to a state in which data may be read out from an electrical port.

Different channels can be provided for transmitting the configuration message. This makes it possible to quickly send the configuration message via the first data link. In addition, the—in particular, simultaneous—use of multiple channels allows the latter to be evenly utilized with respect to the data load and thus transmission capacities to be used effectively.

The configuration message can be transmitted on the different channels in parallel. In many cases, a particularly fast transmission may be ensured hereby. This is particularly advantageous in the case of time-critical or time-sensitive pieces of information, which must be transmitted without significant delays.

The first gateway can be configured to create exactly one configuration message for each setpoint state received. A significant reduction in data loads may be take place hereby. Configuration messages are advantageously generated only as needed, i.e., only in the case of requested changes to the configuration of the I/O data ports. Recurring, periodic transmission of configuration messages and, in particular, also status messages may be avoided hereby.

In another design, the first gateway may be configured to log the actual states of the I/O data ports and to create exactly one configuration message for each non-redundant setpoint state. This permits a particularly effective reduction of configuration messages. Due to a logging, the current configurations are present in the control module, which may continuously access the current configurations and thus also check the necessity for configuration messages.

The second gateway can be configured to register I/O data port state changes and to generate a message at least for each state change not initiated by the second gateway itself in order to notify the first gateway of the state change and to send the message via the first data link. The second gateway may receive or accept configuration messages or I/O data port state changes. It may also send messages relating to the I/O data port configuration to the control module, so that the control module is also notified, in particular, of state changes which have already occurred. The control module or the first gateway may forward the information to the device driver responsible for the relevant I/O data port. The messages generated by the second gateway are typically essentially formatted according to the same protocol as the messages from the first gateway.

The second gateway can be configured to generate a message for each state change of an I/O data port or pin, regardless of whether the state change was carried out by the second gateway itself or by the peripheral device. The implementation of the computer system may be simplified hereby. The data traffic may also be reduced hereby. The generated information may also be helpful, for example, for locating errors (debugging). However, selection rules or certain conditions or checks are also possible, after which a message does not have to be generated for each state change of an I/O data port.

The second gateway can be configured to recognize state changes it did not initiate itself and to generate a configuration message only for these state changes. The data volume may be further reduced hereby compared to the aforementioned example. Further selection rules or a combination of certain conditions or checks are also possible here, after which a message does not have to be generated for each state change of an I/O data port.

The connection module can include a programmable unit. The connection module can include an FPGA as the programmable unit. The acronym "FPGA" stands for "field programmable gate array" and represents a complex semiconductor component. Alternatively, the connection module may also be implemented with a reprogrammable hardware module, also preferably in the form of an FPGA.

The connection module particularly preferably includes a microcontroller apparatus. The circuit may also be designed with discrete active and passive electronic components.

The memory provided in the connection module is preferably a static RAM memory (SRAM). However, other types of memories may also be used for the matching unit. These alternative memory types are not limited to volatile memory types, but may also be nonvolatile memory types. The alternative memories include, for example, MRAM memories or FRAM memories.

The connection module can also be provided with at least one debug interface. The debug interface can correspond to the interfaces of the control unit and is preferably a NEXUS interface. Debug interfaces offer extensive possibilities for monitoring and influencing microcontroller states and permit a runtime monitoring and control (e.g., debugging) of the microcontroller, which makes it possible, in particular, to run program code and to track the accessed and modified data. Since debug interfaces are usually an integral part of the microcontroller hardware, they permit a much faster access to the microcontroller than is possible via a software-based communication interface. The debug interface of a control unit thus allows the state of a control unit microcontroller to be automatically read out and actively influenced, using a suitable interface command set, and, to a certain extent, also the states of units in the control unit connected thereto (e.g., the state of its external memory).

A method is also provided for operating a computer system, which includes a control module, which controls at least one peripheral device, and a connection module, which is connected between the control module and the peripheral device, and is connected to the control module via a first data link, wherein the connection module exchanges pieces of information with the peripheral device via one or multiple I/O data ports via a second data link; the number of channels in the first data link is smaller than the number of I/O data ports of the connection module; the control module receives pieces of setpoint state information relating to the I/O data ports of the connection module via a first gateway; the first gateway sends, in response to the receipt of pieces of setpoint state information of an I/O data port, a configuration message to the connection module via the first data link, which predefines a setpoint state of the I/O data port on the connection module; and the connection module receives the configuration message via a second gateway and sets the I/O data ports accordingly.

The computer system can include multiple peripheral devices.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 shows an example of a view in table form of the channels used and their functions according to one preferred exemplary embodiment of the invention.

DETAILED DESCRIPTION

The multiplicity of I/O data ports mentioned above may not be technically connected directly to actually controlling and processing module 1 (e.g., an FPGA). An indirect control via a further FPGA therefore takes place, which is then used as a port expander. It is connected with far fewer signal lines between the FPGAs than between the peripheral pins. As already mentioned above, this requires an efficient approach for the high-performance, indirect control of connection module 3 to control module 1, i.e., with a high update rate, low latency, and low jitter.

Figure 1:
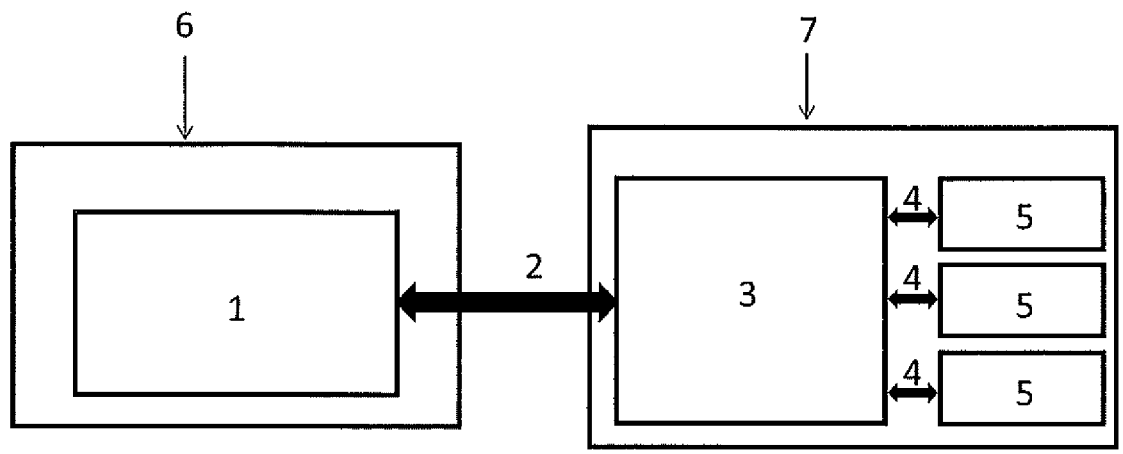
FIG. 1 schematically shows an arrangement of a control module 1 and a connection module 3, which is connected thereto via a first data link 2.

An arrangement of a control module 1 and a connection module 3 which is connected thereto via a first data link 2 is schematically illustrated in FIG. 1. In FIG. 1, multiple peripheral devices 5 are connected to connection module 3 via a second data link 4 in the form of digital I/Os. Control module 1 includes an FPGA or a CPU and is mounted on an FMC carrier 6 (FMC: FPGA mezzanine card). Connection module 3 includes an FPGA as a central unit. Connection module 3 is mounted on an FMC module 7, which rests on FMC carrier 6 based on a plug connection. A first data link 2 is set up between control module 1 and connection module 3 by the plug connection. Peripheral devices 5 are also mounted on FMC module 7.

Figure 2:
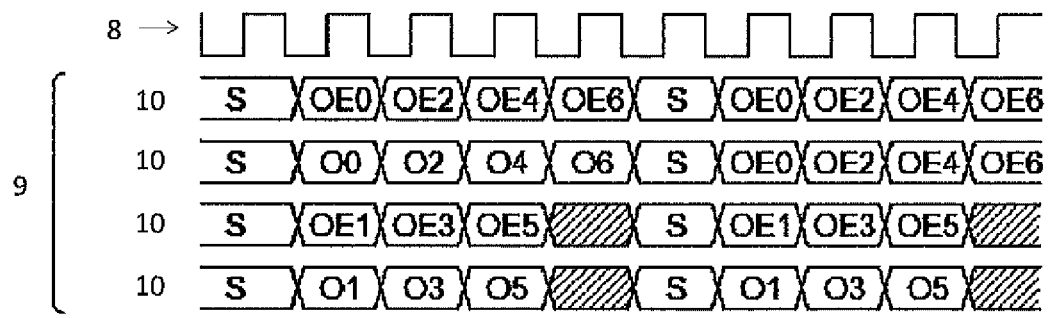
FIG. 2 shows an exemplary schematic representation of the transmission of configuration data for indirectly controlling connection module 3 to the control module.

FIG. 2 shows a previous approach for indirectly controlling peripheral device 5 via connection module 3 by means of control module 1. Up to now, this has usually been done only by transparently sending the control bit for activating the output driver for the output state for control module 1 to/from the expander or connection module FPGA for each I/O pin to be connected (if applicable in each case).

Unlike what is proposed in the present case, all driver control bits and output states were always transmitted in a serialized manner in one direction (if necessary, via multiple channels or so-called "lanes," cf. FIG. 2), and the same procedure was carried out in the other direction for the input states. In the example in FIG. 2, 7 bits each for output enable (OE) and the output state (O) of pins were transmitted via 4 data lines. "S" stands for a start bit for synchronization, which is not discussed in greater detail here. The diagram may be scaled accordingly for an arbitrary number of bits and lanes. This results in a periodic transmission of all bits for each pin. Since the bits generally change only rarely, redundant information is transmitted for the most part.

Figure 3:
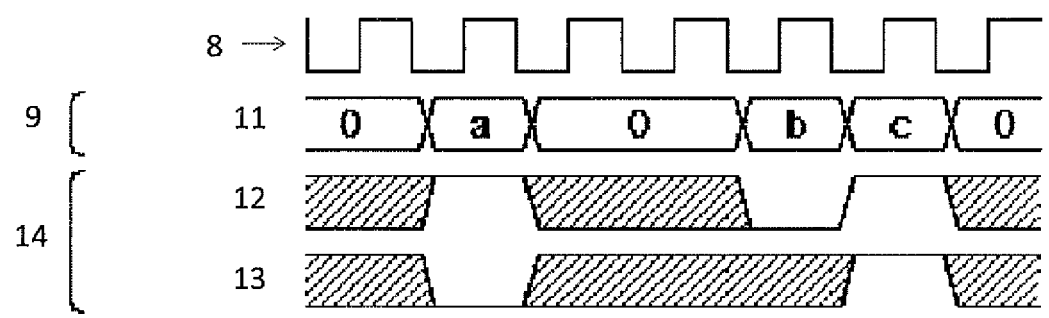
FIG. 3 shows a schematic illustration of an approach according to the invention, in which, instead of transmitting all bits for all pins, exclusively changes to the states are transmitted in both directions.

Instead of periodically transmitting all bits for all pins, it is proposed in the present case to transmit only changes to the states (input, driver activation, and output value) in both directions. FIG. 3 shows a corresponding schematic illustration for this purpose. Only the index and not the state of a modified bit may also be transmitted and, on the receiver side, the selected bit would be reversed, for which purpose the initial state must be fixed or transmitted at the beginning. Although proposed in the following sections, an update within one period is mot absolutely necessary, depending on the available number of channels or lanes. Updates which may occur and possibly accumulate may be buffered, e.g. in a FIFO. Alternatively, certain bits may be given preference in case of a conflict, if stricter time requirements apply to them (priority).

FIG. 3 shows an example of the transmission of configuration data in an example to the invention. The uppermost channel transmits clock signal 8, and the channel thereunder transmits the indexes of pins. In parallel to the indexes, setpoint states (in the flow direction toward connection module 3) or actual states (in the direction of data flow toward control module 1) of the pins indexed in each case are transmitted on two further channels. "Out enable" 12 is a value which indicates whether the pin is currently able to be changed by connection module 3. If the value is 0, the pin is set to "read only," i.e., its state may be influenced only by connected peripheral device 5 but not by connection module 3 or the device driver. "Out value" 13 is the instantaneous value of the pin and may be zero or one or low or high. Pin index 0 is a placeholder, which indicates that no pin is being presently addressed because no changes currently exist to be communicated. The values of out enable 12 and out value 13 (control signals 14) are not relevant in this state, which is illustrated by the crosshatched area. The (setpoint) value of out value 13 is also irrelevant if the value of out enable 12 is zero.

A pin having index "a" is first set to 0 driving ("out enable" high, "out value" low); at pin "b," the driver is deactivated with some delay ("out enable" low), and, at pin "c", the driver is activated in the following cycle and set to 1 driving. The changes for pins b and c may have been generated in the same cycle, but they must be transmitted sequentially in this diagram. A physical bit does not have to be behind each index, e.g., with index 0 as a placeholder here.

By way of example, it is assumed with reference to the table in FIG. 4 that serializer devices, each having a 12C bus and 5 additional I/Os, are to be connected on an FMC module 8, i.e., a total of 56 pins. These pins would each be connected bidirectionally, i.e., 56 bits are to be transmitted from connection module 3 to control module 1 for the input states, and 112 bits are to be transmitted in the other direction for the driver activation and output states. The bridge connection would have a total of 21 channels available, which could be used according to the table in FIG. 4. This makes it possible to transmit the setpoint and actual states of a pin within one data cycle in each case, while many more reserve indexes would be present for future pins or also internal bits to be transmitted. Assuming a realistic clock rate of 100 MHz, this means that an update would be transmittable every 10 ns.

The aforementioned approaches according to the invention offer a great advantage over the existing approach: Individual changes may be communicated at a rate of 100 MHz; in the existing concept, approximately 10 cycles would be needed for the same number of lanes, i.e., one would obtain an update rate of only 10 MHz. In the typical case, the latency drops to 10 ns (instead of 50 ns otherwise), and while the jitter in the previous approach would be 10 ns to 100 ns, it would be typically 10 ns in this case. In the atypical case that multiple pins (are to) change simultaneously, the proposed system would initially have a slight disadvantage compared to the existing approach only if there are more than 10 simultaneously or accumulated changes.

It should be noted that filters may generally be implemented in both directions, from control module 1 to connection module 3 and vice versa, to prevent redundant messages and to reduce the data traffic to the absolute minimum. The main device may thus drive each request from a device driver, a certain pin, to a certain value, check it for redundancy, and generate a control message only if the particular pin is not already in the requested state. A logging via the instantaneous pin states of connection module 3 is necessary for this purpose. Conversely, the connection module may transmit only those pins changes to the control module which were initiated by a peripheral device and not by the connection module itself.

However, filters of this type increase the implementation complexity. In an example, the control module can generate a control message for each pin change requested by a driver, and the connection module will generate a status message for each pin change. A complete feedback of this type is advantageous, in particular on the part of connection module 3, e.g., with regard to debugging or error monitoring.

The invention makes it possible to achieve a significant reduction in the latency and jitter of the state mirroring in typical applications, in particular if no frequent, (nearly) simultaneous switching of many pins takes place, while changes to individual or only a few pins may be transmitted simultaneously at a much higher frequency. The potential performance increase permits, for example, higher frequencies in buses tunneled hereby, such as I2C or SPI.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer system comprising:
   at least one peripheral device;
   a control module to control the peripheral device; and
   a connection module that is connected to the control module via a first data link, the connection module comprising I/O data ports for exchanging pieces of information with the peripheral device, the peripheral device being connected to one or a plurality of the I/O data ports via a second data link,
   wherein a number of channels in the first data link is smaller than a number of I/O data ports of the connection module,
   wherein the control module includes a first gateway, which receives pieces of setpoint state information relating to the I/O data ports of the connection module,
   wherein the first gateway is configured to send, in response to the receipt of pieces of setpoint state information of an I/O data port, a configuration message to the connection module via the first data link, which predefines a setpoint state of the I/O data port on the connection module, the configuration message only being sent for an I/O data port in which a state change occurred, and
   wherein the connection module is configured to receive the configuration message via a second gateway and to set the I/O data ports accordingly.

2. The computer system according to claim 1, wherein the connection module includes at least one programmable unit.

3. The computer system according to claim 2, wherein the connection module includes an FPGA as the programmable unit.

4. The computer system according to claim 2, wherein the connection module includes a microcontroller apparatus.

5. The computer system according to claim 1, wherein the configuration message includes only an index of the I/O data port and not the state of the I/O data port.

6. The computer system according to claim 1, wherein the first gateway is configured to create exactly one configuration message for each setpoint state received.

7. A computer system comprising:
   at least one peripheral device;
   a control module to control the peripheral device; and
   a connection module that is connected to the control module via a first data link, the connection module comprising I/O data ports for exchanging pieces of information with the peripheral device, the peripheral device being connected to one or a plurality of the I/O data ports via a second data link,
   wherein a number of channels in the first data link is smaller than a number of I/O data ports of the connection module,
   wherein the control module includes a first gateway, which receives pieces of setpoint state information relating to the I/O data ports of the connection module,
   wherein the first gateway is configured to send, in response to the receipt of pieces of setpoint state information of an I/O data port, a configuration message to the connection module via the first data link, which predefines a setpoint state of the I/O data port on the connection module,
   wherein the connection module is configured to receive the configuration message via a second gateway and to set the I/O data ports accordingly, and
   wherein the computer system includes one or multiple drivers, which are configured to generate at least one setpoint state for the peripheral device and transmit it to the first gateway.

8. A computer system comprising:
   at least one peripheral device;
   a control module to control the peripheral device; and
   a connection module that is connected to the control module via a first data link, the connection module comprising I/O data ports for exchanging pieces of information with the peripheral device, the peripheral device being connected to one or a plurality of the I/O data ports via a second data link,
   wherein a number of channels in the first data link is smaller than a number of I/O data ports of the connection module,
   wherein the control module includes a first gateway, which receives pieces of setpoint state information relating to the I/O data ports of the connection module,
   wherein the first gateway is configured to send, in response to the receipt of pieces of setpoint state information of an I/O data port, a configuration message to the connection module via the first data link, which predefines a setpoint state of the I/O data port on the connection module,
   wherein the connection module is configured to receive the configuration message via a second gateway and to set the I/O data ports accordingly, and
   wherein the configuration message comprises an I/O data port index and a setpoint state of the indexed I/O data port concerned.

9. The computer system according to claim 8, wherein the configuration message comprises pieces of information relating to the ability of the I/O data port to be written and read out.

10. The computer system according to claim 8, wherein multiple channels are provided for the purpose of transmitting the configuration message.

11. The computer system according to claim 10, wherein the computer system transmits the configuration message on the multiple channels in parallel.

12. A computer system comprising:
    at least one peripheral device;
    a control module to control the peripheral device; and
    a connection module that is connected to the control module via a first data link, the connection module comprising I/O data ports for exchanging pieces of information with the peripheral device, the peripheral device being connected to one or a plurality of the I/O data ports via a second data link,
    wherein a number of channels in the first data link is smaller than a number of I/O data ports of the connection module,
    wherein the control module includes a first gateway, which receives pieces of setpoint state information relating to the I/O data ports of the connection module,
    wherein the first gateway is configured to send, in response to the receipt of pieces of setpoint state information of an I/O data port, a configuration message to the connection module via the first data link, which predefines a setpoint state of the I/O data port on the connection module, wherein the connection module is configured to receive the configuration message via a second gateway and to set the I/O data ports accordingly, and wherein the first gateway is configured to create exactly one configuration message for each setpoint state received.

13. The computer system according to claim 12, wherein the first gateway is configured to log the actual states of the I/O data ports and to create exactly one configuration message for each non-redundant setpoint state.

14. A computer system comprising;

at least one peripheral device;

a control module to control the peripheral device; and a connection module that is connected to the control module via a first data link, the connection module comprising I/O data ports for exchanging pieces of information with the peripheral device, the peripheral device being connected to one or a plurality of the I/O data ports via a second data link wherein a number of channels in the first data link is smaller than a number of I/O data ports of the connection module, wherein the control module includes a first gateway, which receives pieces of setpoint state information relating to the I/O data ports of the connection module, wherein the first gateway is configured to send, in response to the receipt of pieces of setpoint state information of an I/O data port, a configuration message to the connection module via the first data link, which predefines a setpoint state of the I/O data port on the connection module, wherein the connection module is configured to receive the configuration message via a second gateway and to set the I/O data ports accordingly, and wherein the second gateway is configured to register I/O data port state changes and generate a message at least for each state change not initiated by the second gateway itself in order to notify the first gateway of the state change, and configured to send the message via the first data link.

15. The computer system according to claim 14, wherein the second gateway is configured to generate a message for each state change of an I/O data port, regardless of whether the state change was carried out by the second gateway itself or by the peripheral device.

16. The computer system according to claim 14, wherein the second gateway is configured to recognize state changes it did not initiate itself and to generate a configuration message only for these state changes.

17. A method for operating a computer system, which includes a control module that controls at least one peripheral device, and a connection module that is connected between the control module and the peripheral device, and is connected to the control module via a first data link, the method comprising:

exchanging, via the connection module, pieces of information with the peripheral device via one or multiple I/O data ports via a second data link, a number of channels in the first data link being smaller than a number of I/O data ports of the connection module;

receiving, via the control module, pieces of setpoint state information relating to the I/O data ports of the connection module via a first gateway;

sending, via the first gateway, in response to the receipt of pieces of setpoint state information of an I/O data port, a configuration message to the connection module via the first data link, which predefines a setpoint state of the I/O data port on the connection module, the configuration message only being sent for an I/O data port in which a state change occurred; and receiving, via the connection module, the configuration message via a second gateway and sets the I/O data ports accordingly.

* * * * *